United States Patent
Goder et al.

(10) Patent No.: US 6,424,880 B1
(45) Date of Patent: Jul. 23, 2002

(54) MULTI-COMPUTER CHAMBER CONTROL SYSTEM, METHOD AND MEDIUM

(75) Inventors: Alexey G. Goder, Sunnyvale; Mark Yam, Monte Sereno, both of CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 09/393,910

(22) Filed: Sep. 10, 1999

(51) Int. Cl.[7] ............................................. G06F 19/00
(52) U.S. Cl. ............................ 700/121; 700/2; 700/20; 438/5; 438/14
(58) Field of Search .......................... 700/1–2, 19–20, 700/121; 438/5, 14

(56) References Cited

U.S. PATENT DOCUMENTS

| | | | |
|---|---|---|---|
| 4,215,399 A | | 7/1980 | Pavicic et al. |
| 5,448,470 A | * | 9/1995 | Nishihata et al. ............... 700/2 |
| 5,495,588 A | | 2/1996 | Gibart et al. |
| 5,659,467 A | * | 8/1997 | Vickers ........................... 700/9 |
| 5,663,884 A | * | 9/1997 | Nishihata et al. ........... 700/121 |
| 5,683,561 A | | 11/1997 | Hollars et al. |
| 5,831,851 A | | 11/1998 | Eastburn et al. |
| 6,303,395 B1 | * | 10/2001 | Nulman ....................... 438/14 |

FOREIGN PATENT DOCUMENTS

| | | |
|---|---|---|
| EP | 0553731 | 8/1993 |
| JP | 63304302 | 12/1988 |

OTHER PUBLICATIONS

EPO Communication (Search Report), Mar. 13, 2001.

* cited by examiner

Primary Examiner—Thomas Black
Assistant Examiner—Ronald D Hartman, Jr.
(74) Attorney, Agent, or Firm—Hale and Dorr LLP (57) ABSTRACT

A system, method and medium for controlling a wafer processing chamber using two or more processors (within one or more computer processing systems), wherein specified functions are assigned to each processor. Some embodiments contemplate that each processor may reside within its own computer processor system (each computer processor system being in communication with the other), wherein each computer processor system implements specified functions to control and maintain certain parameters involved in the manufacture of the wafer. This allows the present invention to react quickly to maintain rapidly-changing desired conditions within a wafer processing chamber and to maintain a greater degree of uniformity of those conditions throughout the wafer.

24 Claims, 8 Drawing Sheets

FIG. 1

FIG. 2 PERSPECTIVE FROM FIRST COMPUTER PROCESSOR SYSTEM

MULTI-COMPUTER CHAMBER CONTROL SYSTEM, METHOD AND MEDIUM

BACKGROUND

1. Field of the Invention

The present invention relates to enhanced control of a wafer processing facility. More specifically, the present invention relates to a system, method and medium for the accurate and highly responsive implementation of one or more instructions/functions relating to the production of wafers in a wafer processing facility, and particularly for controlling one or more wafer processing chambers within a wafer processing facility. The present invention accomplishes this by utilizing two or more processors, which may reside in separate computer processor systems, wherein each processor and/or computer processor system is assigned to control, and sample information relating to, one or more designated functions (e.g., temperature, pressure, etc.).

2. Related Art

With each passing year, engineers continue to attempt to squeeze more and more circuits into a smaller and smaller space on integrated circuit chips. As a result, the various films deposited or grown atop the "wafer" (or substrate), from which these circuits are designed, also need to become thinner and thinner, allowing smaller and smaller elements (e.g., gates) to be squeezed into a given space. In particular, current designs are moving into the 0.15 to 0.1 micron range (i.e., the minimum horizontal width for an element). At the same time, the industry standard diameters of the semiconductor wafers are expanding from 200 mm to 300 mm. (These wafers are then typically cut into smaller pieces for use in the actual chips).

In general, it has been conventionally important to accurately and expediently control the parameters used in the manufacture of wafers. For example, with regard to temperature, it is desirable to obtain temperature uniformity in the wafer during temperature cycling. Temperature uniformity provides for uniformity of aspects of the end-product wafer, such as layer thickness, resistivity, and etch depth. In addition, temperature uniformity in a wafer is necessary to prevent thermal stress-induced wafer damage such as warpage, defect generation and slip. Such control of temperature also becomes increasingly important as one attempts to increase the rate of wafer production (e.g., wafers per hour), since that requires the duration that the wafer is heated and cooled to be reduced (and, thus, the rates of temperature changes become more extreme). Also, it is often the case that the rapid temperature changes yield better results in the quality of the end-product wafer, as well. Other functions that may also require such control include pressure and the positioning of the wafer within the wafer processing chamber.

Prior wafer processing facilities such as the RTP XEplus Centura and the HTF Centura (with, e.g., LPCVD Polysilicon chambers) from Applied Materials of Santa Clara, Calif. do provide some control of the various functions mentioned above in the course of controlling their wafer processing chambers. However, as critical dimmensions continue to shrink, it becomes increasingly important to more and more accurately and expediently control the functions used in their manufacture. With regard to temperature, for example, the smaller elements will not be created properly, and the wafer itself will be more prone to warpage, if the temperature is not uniformly and expediently controlled.

In practice, it has been found that the control mechanisms of the prior wafer processing facilities mentioned above are unable to adequately fulfill the demands necessary to effectively manufacture the thinner films having greater diameters at the throughput required. For example, it has been found that the amount of information coming in from numerous sensors which must be analyzed and responded to quickly causes significant congestion on the various conduits (e.g., busses) of the computer processing system of the wafer processing facility, and that the constant interruptions that are placed upon the processor (due to, e.g., receipt of sensor information) tend to degrade from the performance of the computer processing system in its attempt to control the parameters of the wafer processing chamber.

Consequently, what is needed is a scheme for responding to the increasing demands arising from the manufacture of the wafers described above such that the necessary functions can be observed and adjusted quickly and in accordance with a set of instructions (i.e., a "recipe") dictating the requirements for the manufacture of such wafers.

SUMMARY OF THE INVENTION

The present invention solves the problems mentioned above by providing a system, method and medium for controlling a wafer processing chamber using two or more processors (within one or more computer processing systems), wherein specified functions are assigned to each processor. More specifically, some embodiments of the present invention contemplate that each processor has its own communications conduit (e.g., central bus), and that each may reside within its own computer processor system (each computer processor system being in communication with the other), wherein each computer processor system implements specified functions to control and maintain certain parameters involved in the manufacture of the wafer. This allows the present invention to react quickly to maintain rapidly-changing desired conditions within a wafer processing chamber and to maintain a greater degree of uniformity of those conditions throughout the wafer.

Embodiments of the present invention contemplate that the wafer (referring hereafter to the end product wafer plus film) is manufactured in accordance with a recipe (which contains instructions and/or individual functions to be implemented within the wafer processing chamber). Consequently, a focus of at least some aspects of the present invention relates to ensuring that the instructions/functions in the recipe that are followed accurately and expediently.

As indicated above, embodiments of the present invention contemplate that each processor within the one or more computer processor systems is assigned to oversee a particular function (e.g., temperature or pressure). Various embodiments of the present invention further contemplate situations where each instruction step contains multiple functions such as temperature and pressure (or some other situation where multiple functions can run concurrently), and that one of those functions is designated as "controlling." For example, a given instruction step might indicate that both the temperature and pressure in a wafer processing chamber need to be increased, and also indicate that "temperature" is to be "controlling." Then, the processor which is assigned to oversee temperature will be in control such that when the temperature reaches the goal indicated by the instruction step, the controlling processor will indicate to the other processors that the next instruction should be implemented, and will itself implement that next step. In this way, critical functions can be selected and implemented quickly and efficiently.

BRIEF DESCRIPTION OF THE DRAWINGS

Various objects, features, and attendant advantages of the present invention can be. more fully appreciated as the same become better understood with reference to the following detailed description of the present invention when considered in connection with the accompanying drawings, in which.

DETAILED DESCRIPTION

The present invention relates to enhanced control of a wafer processing facility. More specifically, the present invention relates to a system, method and medium for the accurate and highly responsive implementation of one or more instructions/functions relating to the production of wafers in a wafer processing facility, and particularly for controlling one or more wafer processing chambers within a wafer processing facility. The present invention accomplishes this by utilizing two or more processors, which may reside in separate computer processor systems, wherein each processor and/or computer processor system is assigned to control, and sample information relating to, one or more designated functions (e.g., temperature, pressure, etc.).

Figure 1:
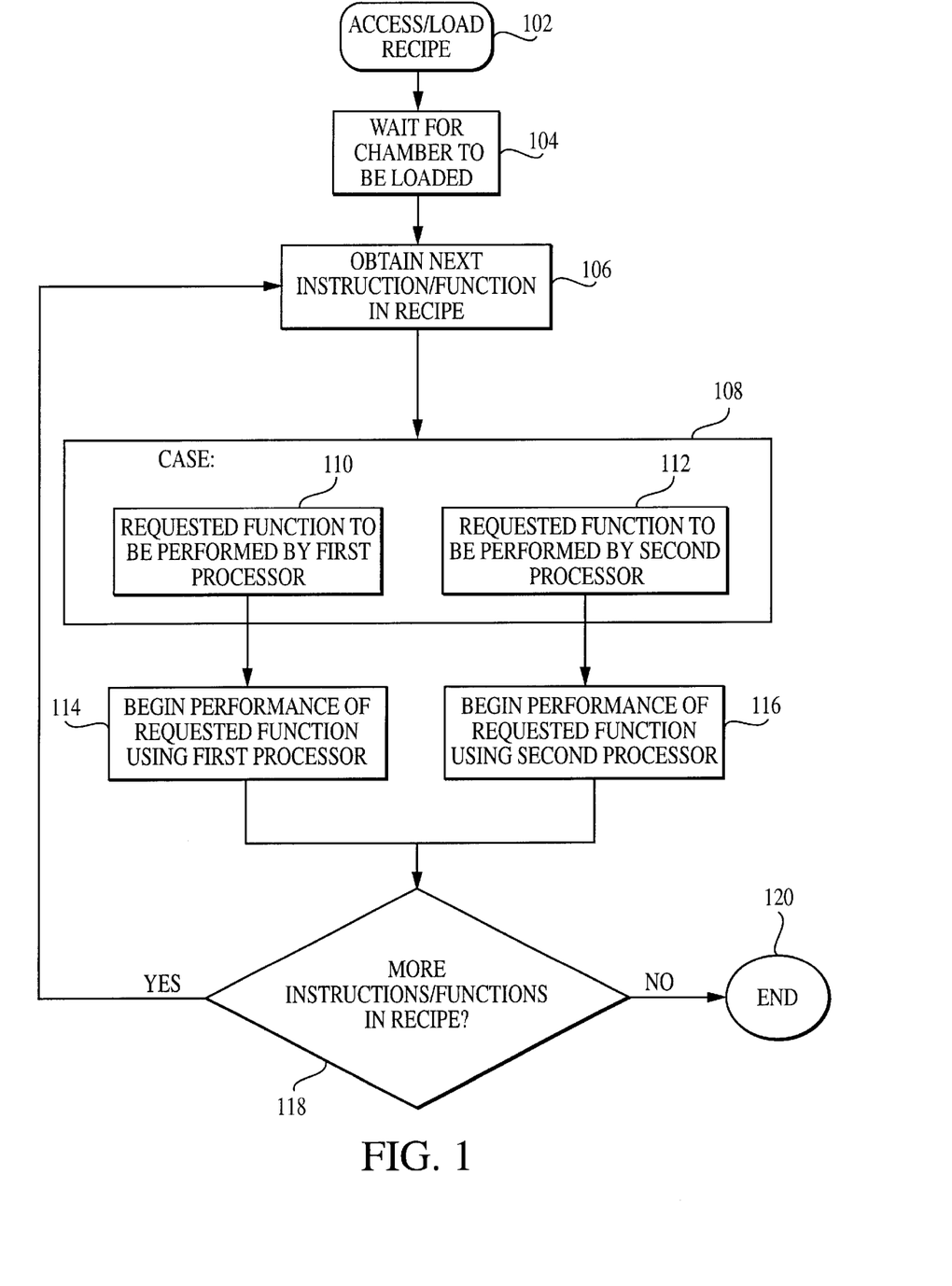
FIG. 1 is a high-level flow diagram depicting the utilization of two processors to implement the wafer control functions contemplated by embodiments of the present invention.

A process contemplated by embodiments of the present invention will now be discussed with regard to FIG. 1. Referring now to FIG. 1, the first step is that a given set of instructions (i.e., a "recipe") that one or more wafer processing chambers within a wafer processing facility are to follow is accessed/loaded by the processors of one or more computer processing systems, generally, as indicated by a Block 102. Embodiments of the present invention contemplate that the identical recipe can be loaded by all processors which will be used to implement the various specified functions of the recipe, though it is also contemplated in other embodiments that different related recipes may be accessed/loaded by each processor, where each recipe has information pertinent to the particular function that the processor as been assigned to perform.

The next step is to wait for some indication that a wafer processing chamber has been (or will be) loaded, as indicated by a Block 104. Thus, a signal is received that a wafer processing chamber has actually been loaded, or that one will be loaded in due course and to commence the recipe sequence.

The next step is to obtain a next instruction/function in the recipe, as indicated by a Block 106. In particular, the present invention envisions that instructions can contain multiple functions to be implemented and/or contain a single function. An example of a multi-function instruction might be, e.g., "lower the temperature to 600 degrees at 50 degrees per second and raise pressure to 780 Torr at 20 Torr per second." (While the term "function" is used herein to denote both the general concept (e.g., "temperature control") and a specific implementation (e.g., "raise the temperature 50 degrees), specific implementations can also be referred to as "commands.")

Once it has been determined which function(s) is to be implemented next, the next step is to determine which processor is to perform that function, as indicated by a case Block 108. If the requested function to be performed has been assigned to the first processor, as indicated by a Block 110, then performance of the requested function will commence using that first processor, as indicated by a Block 114. Conversely, if the requested function to be performed is one assigned to the second processor, as indicated by a Block 112, then performance of the requested function will commence using that second processor, as indicated by a Block 116.

It should be understood that FIG. 1's mention of the use of two processors is by way of example, and that the present invention also contemplates the use of more than two processors (within any number of computer processor systems) to implement (and be assigned) any number of different functions. Also, the present invention envisions that there are any number of ways for determining which processor should perform (or be assigned to) a given function.

The present invention contemplates any number of embodiments (and combinations thereof) for determining when to discontinue implementing the current function(s)/instruction and obtain/implement the next one. In one exemplary embodiment, multiple functions (within, e.g., a multi-function instruction) are implemented using the different processors substantially simultaneously, and one or more (or all) of the functions can be selected as the "controlling" function, such that when the controlling function(s) reaches its stated goal, the next instruction is implemented regardless of whether any non-controlling functions have reached their goals. Thus, for example, if each instruction contains a temperature and a pressure function and only temperature is chosen as the controlling function, then when the desired temperature is reached, the next instruction is obtained and implemented even if the desired pressure stated in the previous instruction has not been reached. However, it may also be the case that each instruction contains only some of the possible functions which can be implemented, and thus if a subsequent instruction does not contain a function that would preempt a previously implemented function, at least some embodiments contemplate that the previously implemented function would be allowed to continue toward its set goal. Also, straight time limits can be set within an instruction (e.g., maintain the current temperature for 10 seconds). Of course, various other schemes are also contemplated, such as those involving sequentially implementing a stream of individual functions with various time limits associated with them, and the like.

After the desired function(s)/instruction have been implemented (or commenced) as indicated above, the next step is to determine whether there are any more instructions/functions in the recipe to be implemented, as indicated by a decision Block 118. If so, the next step is to obtain the next instruction/function in the recipe, as indicated by Block 106. Otherwise, the recipe sequence ends, as indicated by a Block 120.

Figure 2:
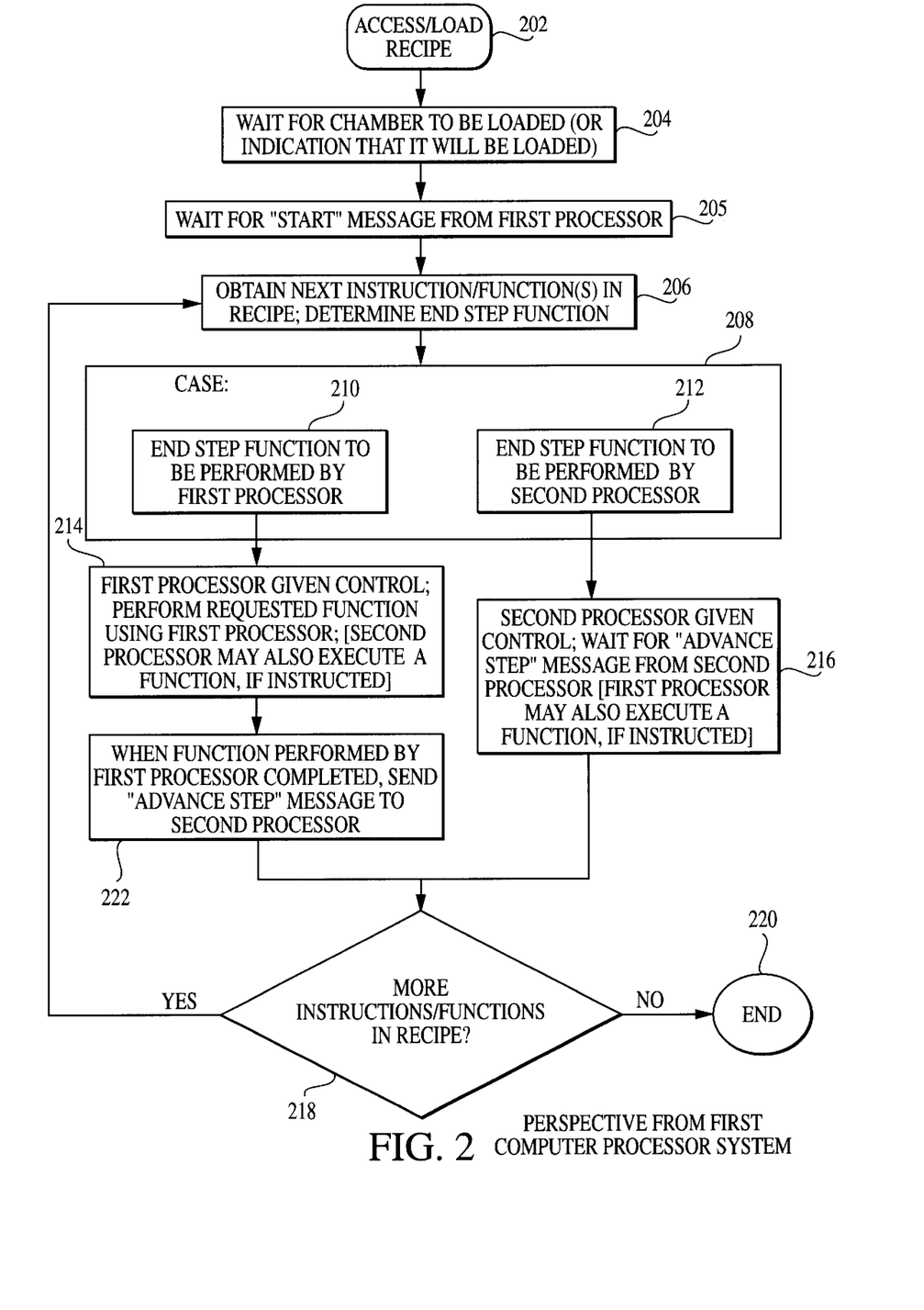
FIGS. 2 and 3 are flow diagrams depicting embodiments of the present invention where control during the implementation of an instruction is given to a selected processor.
Figure 3:
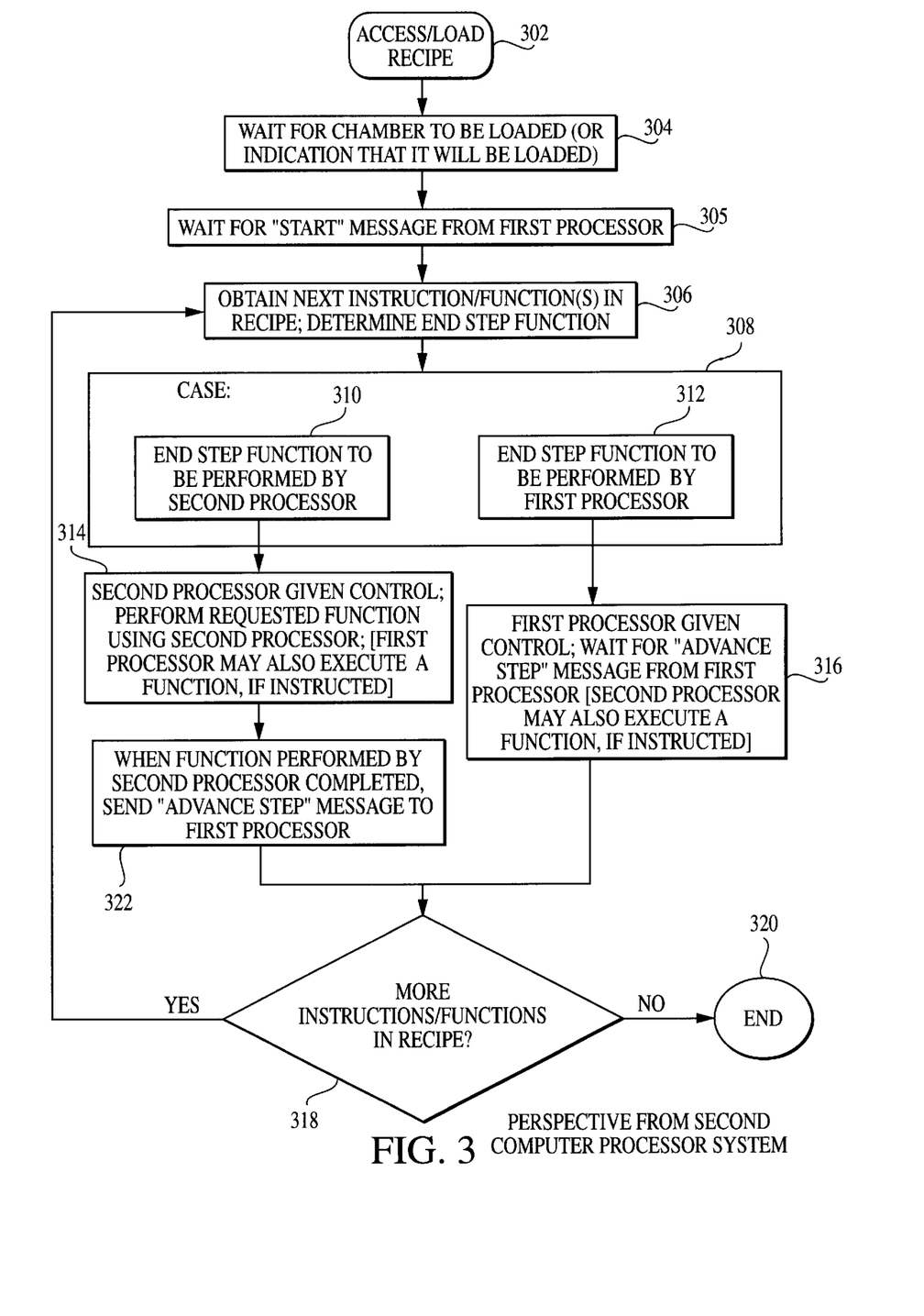

FIGS. 2 and 3 disclose a process contemplated by embodiments of the present invention where two computer processor systems (each having at least one processor) are used, and where one of the processors is given control during the implementation of an instruction, so that when the function being implemented by the controlling processor has terminated, the next instruction/function(s) of the recipe will then be implemented (with possibly the same or a different processor then being in control). In general, it is contemplated that more than one function is initiated at substantially the same time (via, e.g., a multi-function instruction), though other implementations are contemplated, as well (e.g., the functions are implemented at staggered time periods).

Referring first to FIG. 2, this figure discloses the implementation of a recipe from the perspective of the first computer processor system. In FIG. 2, the first step is that the first processor system accesses or loads the recipe to be implemented, as indicated by a Block 202. Before commencing implementation of the recipe, the present invention waits for the chamber to be loaded, or at least waits for to some indication that it will be loaded, as indicated by a Block 204. This, in turn, signals the first processor to generate a "start" message (e.g., some indication that the recipe should now be implemented) as indicated by a Block 205. Embodiments of the present invention, in accordance with FIGS. 2 and 3, contemplate that the first processor and second processor step through the same recipe instructions substantially simultaneously, and that it is the first processor that initially sends a signal to the second processor to commence implementation of the recipe upon the indication that the chamber has been loaded (or will be loaded).

The next step is that the next instruction or function(s) in the recipe are obtained, as indicated by a Block 206. Also indicated by a Block 206 is a determination as to which function is to cause the current instruction (or group of currently-implemented functions) to end once its set goal has been reached.

The next step is to determine whether the end step function (determined in accordance with Block 206) is one that has been assigned to be performed by the first processor or the second processor, as indicated by a Case Block 208. If it is determined that the end step function is to be performed by the first processor (e.g., the end step function is temperature, and the first processor has been assigned to control the temperature) then the first processor is given control (e.g., it determines when the current instruction ends and when the next one should be implemented) as indicated by Blocks 210 and 214. Also as indicated by Block 214, the first processor will perform the requested function, while the second processor may also be executing a function (where, e.g., the current instruction contains more than one function to be implemented).

Once the function that is performed by the first processor has been completed, the first processor will indicate to the second processor that the next instruction/function is to be implemented by sending an "advanced step" message to the second processor, as indicated by a Block 222. The first processor system, itself, will then determine whether there are more instructions/functions in the recipe that need to be implemented, as indicated by a Decision Block 218, and if so, will obtain (and implement) the next instruction as indicated by Blocks 206 (and by the subsequent Blocks in the Figure). Otherwise, the recipe will end, as indicated by a Block 220.

Returning to Case Block 208, if it is determined that the end step function is to be performed by the second processor, as indicated by a Block 212, then the second processor is given control, as indicated by a Block 216. Then, from the first processor's perspective, the first processor will wait for an "advanced step" message from the second processor (which will be received once the function performed by the second processor has terminated), also as indicated by Block 216. Again, depending upon the instruction, the first processor may also execute a function.

Referring now to FIG. 3, this figure is essentially a mirror image of FIG. 2, in that it is from the perspective of the second processor system. It should be noted, however, with regard to Block 305, that it is contemplated that the recipe will be initiated by the first processor.

With regard to FIGS. 1, 2, and 3, it should be understood that the steps and the order of the steps are by way of example, and that the present invention contemplates that additional steps could be added, and/or certain ones omitted and/or the order of steps changed to implement aspects envisioned by embodiments of the present invention. Also, with regard to FIGS. 2 and 3, many of the embodiments discussed with regard to FIG. 1 are also applicable to FIGS. 2 and 3.

Figure 4:
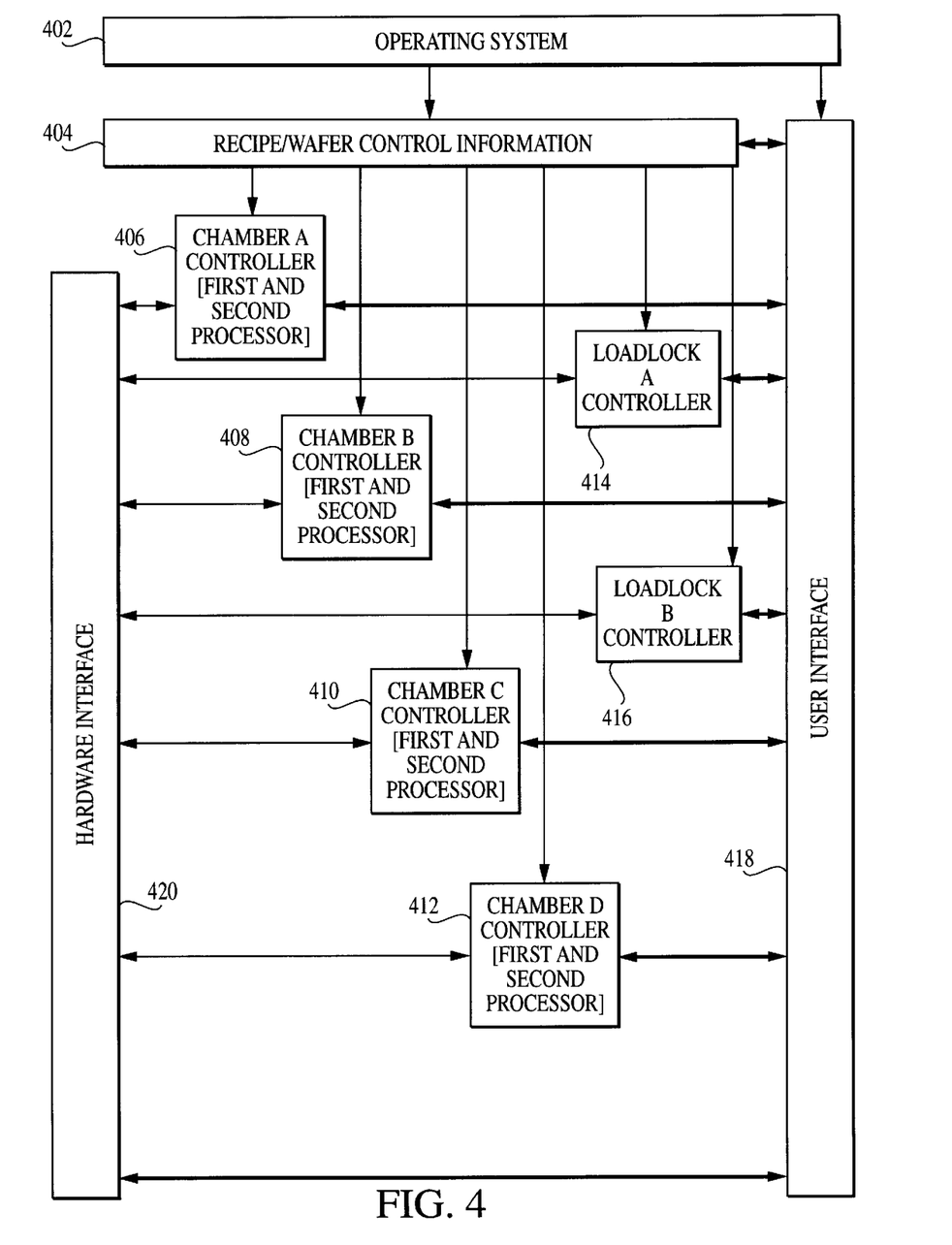
FIG. 4 is a high-level block diagram of functional modules as contemplated by embodiments of the present invention.

An exemplary recipe that can be used with embodiments of the present invention is shown below, where the temperature is envisioned to be controlled by a second processor and all other functions are controlled by a first processor. Here, the recipe explicitly indicates which processor is in control, although it can also be determined by the step, end condition:

Step 1.
    Temperature Control: Open Loop, apply 25% power
    Pressure Control: Servo at 780 Torr
    Gas Flow: N2 5 Standard Liters per Minute
    Step End Condition: Temperature above 550 Degree C
    Master (i.e., processor in control): Second Processor Step 2.
    Temperature Control: Stabilize Temperature at 550 Degree C
    Pressure Control: Ramp Down to 700 Torr, 20 Torr per second
    Gas Flow: N2 5 Standard Liters per Minute
    Step End Condition: Pressure below 700 Torr
    Master: First Processor Step 3.
    Temperature Control: Ramp temperature to 1000 degrees C at 180 degrees per second
    Pressure Control: Servo at 700 Torr
    Gas Flow: N2 5 Standard Liters per Minute
        N2 Bottom Purge 20 Standard Liters per Minute
    Step End Condition: Temperature above 1000 degrees C
    Master: Second Processor Step 4.
    Temperature Control: Constant temperature at 1000 Degrees
    Pressure Control: Servo at 700 Torr
    Gas Flow: N2 5 Standard Liters per Minute
        N2 Bottom Purge 20 Standard Liters per Minute
    Step End Condition: By time: 10 sec
    Master: Second Processor Step 5.
    Temperature Control: Ramp temperature down to 800 Degree at 50 Degrees per Second
    Pressure Control: Servo at 700 Torr Gas Flow: N2 5 Standard Liters per Minute
N2 Bottom Purge 20 Standard Liters per Minute
Step End Condition: Temperature below 800
Master: Second Processor Step 6.
Temperature Control: Ramp temperature down to 600 Degrees at 50 Degrees per Second
Pressure Control: Ramp up to 780 Torr at 20 Torr per Second
Gas Flow: N2 5 Standard Liters per Minute
He 20 Standard Liters per Minute
Step End Condition: Pressure at 780 Torr
Master: First Processor
END RECIPE FIG. 4 is a high-level diagram of functional modules utilized in a Wafer processing facility (contemplated to be implemented primarily in software, but which can also be in whole or part implemented in hardware) used in embodiments of the present invention. It is envisioned that each of these functional modules is utilized (in some form) in conjunction with each of the processors, and thus the modules are part of (or at least accessible by) each computer processor system. (Thus, each of the modules is envisioned to be associated with each of the computer processor systems such that, e.g., each module may actually exist as separate entities, where each entity resides on one of the various computer processor systems.) Consequently, while the high-level functionality of each module may be used by the various processors, the actual lower-level implementation may differ with each processor (as will be seen in the example of FIG. 5a).

For purposes of discussion, FIG. 4 contemplates the use of a first and second processor residing on a first and second computer processing system, respectively, for use in controlling four different chambers (chambers A–D). However, more than two computer processing systems (and processors per computer processing system) are also contemplated, each of which can control one or more assigned functions and/or be assigned to one or more chambers.

Referring now to FIG. 4, each computer processor system is contemplated to have its own operating system, as indicated by Block 402. Recipe/wafer Control Information 404 contains the recipe itself, as well as other information pertinent to the control of a wafer within a wafer processing chamber.

As indicated above, embodiments of the present invention contemplate that the overall wafer processing facility can contain any number of wafer processing chambers, and FIG. 4 contemplates the existence of four wafer processing chambers (A–D), each of which is controlled by a chamber controller (406, 408, 410, and 412).

Again, like all of the functional modules depicted in the Figure, each chamber controller (406–412) is envisioned to exist, in some form, with regard to each computer processor system (and thus with regard to first and second processor). Embodiments of the present invention contemplate that each of these chamber controllers could access/be loaded with the same recipe, or they can each have a different recipe obtained from recipe/wafer control information 404.

Load lock controllers 414 and 416 are envisioned to control the loading and unloading of the physical wafer into and out of each of the wafer processing chambers (only A and B are shown for convenient reference). Also shown is a hardware interface 420 and user interface 418. The hardware interface connects the computer processor systems with the actual wafer processing chambers for manufacturing the wafers. As will be appreciated by those skilled in the art, the specifics of the hardware interface will depend upon the particular interface characteristics of the wafer processing chamber being used.

Figure 5A:
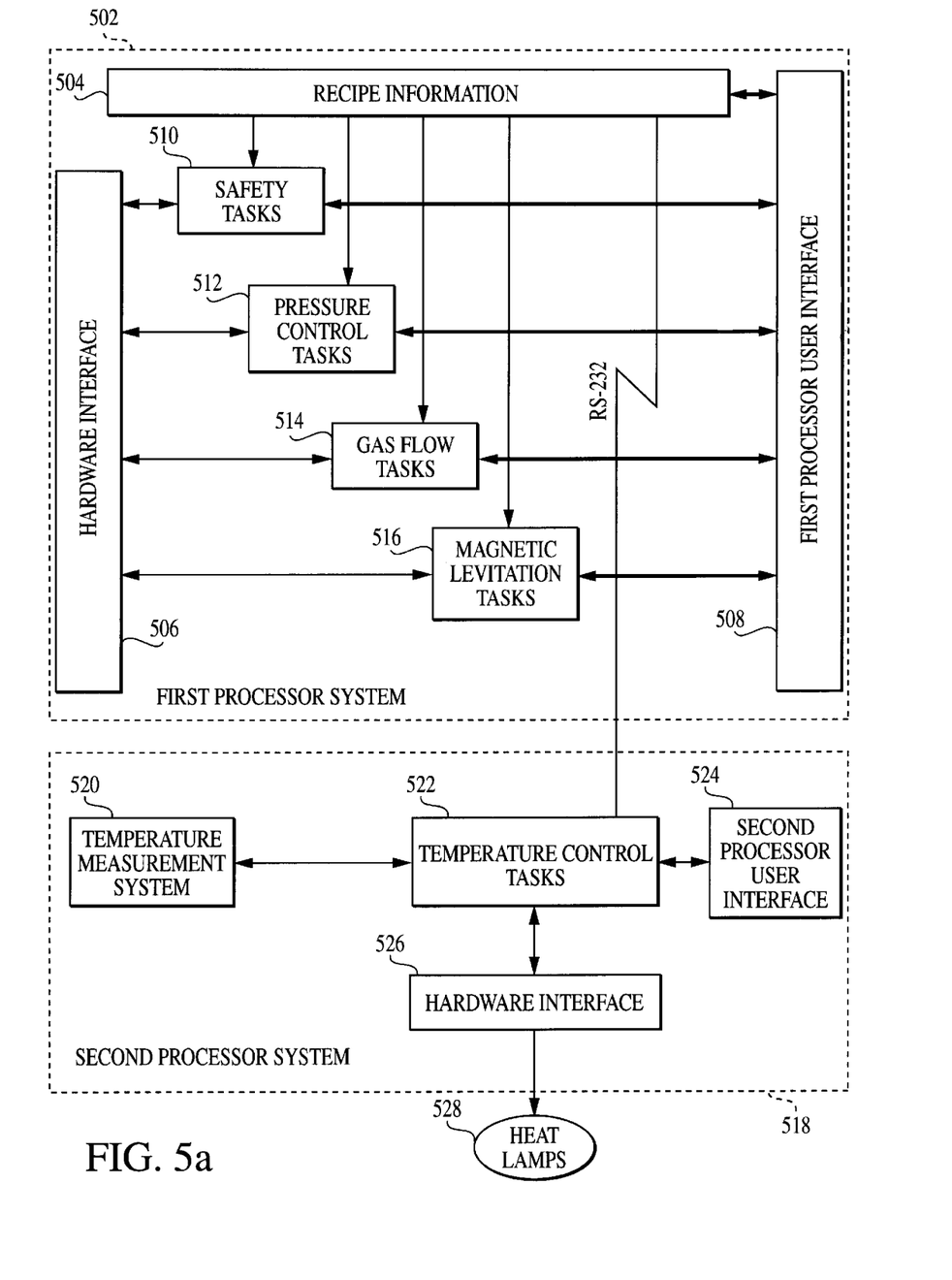
FIG. 5a is a block diagram of functional modules of an exemplary chamber controller.

A more detailed diagram of each of the chamber controllers (e.g., 406), as envisioned by embodiments of the present invention, is now shown and described with regard to FIG. 5a. Referring to FIG. 5a, Block 502 depicts an exemplary embodiment of the chamber controller as it may exist on the first computer processor system, while a Block 518 depicts the chamber controller for a second processor system. In particular, and by way of example, it can be seen that the first computer processor system contains the recipe information (Block 504) and is in control of the safety tasks (Block 510) (e.g., checking to see if doors and covers are closed, whether any dangerous conditions exist, etc.), pressure control tasks (Block 512) gas flow tasks (Block 514) and magnetic levitation tasks (Block 516). The second processor system 518, in this embodiment, is in control only of the temperature control tasks (as indicated by a Block 522). Embodiments of the present invention contemplate that the temperature control tasks 522 contain certain control algorithms, including taking a reading of the current temperatures within a wafer processing chamber (which was computed by Temperature Measurement System 520, described below), comparing them to the current set point temperatures as well as future set point temperatures, and from that calculating the necessary voltages to send to the heat lamps (mentioned below) to heat the wafer.

The chamber controller of the second processor system 518 is in communication with the chamber controller of the first processor system 502 via a communication link such as an RS 232 link. It could of course be any type of link, such as via Ethernet, or the like. In any event, it is contemplated that, through that link, the two processor systems interact as described above, and the second processor system receives recipe information.

The chamber controllers of both the first and second processor systems each have a user interface (508 and 524, respectively) and a hardware interface (506 and 526, respectively). By having the temperature controlled by a separate computer processor system, as indicated in the Figure, the temperature can be more accurately and quickly responded to, maintained and manipulated. In this way, a temperature measurement system 520, for example, can be more effectively utilized in order to accurately and quickly measure the temperature at various portions of the chamber, so that desired changes to the temperature of the chamber can be implemented quickly and uniformly. Thus, the heat lamps 528 can be controlled more effectively to quickly and precisely react so that very thin film layers (and elements) can be successfully manufactured. In particular, embodiments of the present invention contemplate that, within a given wafer processing chamber, heat lamps 528 are made up of multiple individual lamps, each for heating a particular portion of a given wafer, and each of which is individually adjustable to fine-tune the temperature of that particular portion, and thus collectively across the entire wafer.

It should be understood that the division of functions as shown in FIG. 5a is by way of example, and that, for example, any number of different schemes and scenarios could be implemented whereby more than two processor systems (and more than two processors) are utilized, each controlling one or more separate functions.

Figure 5B:
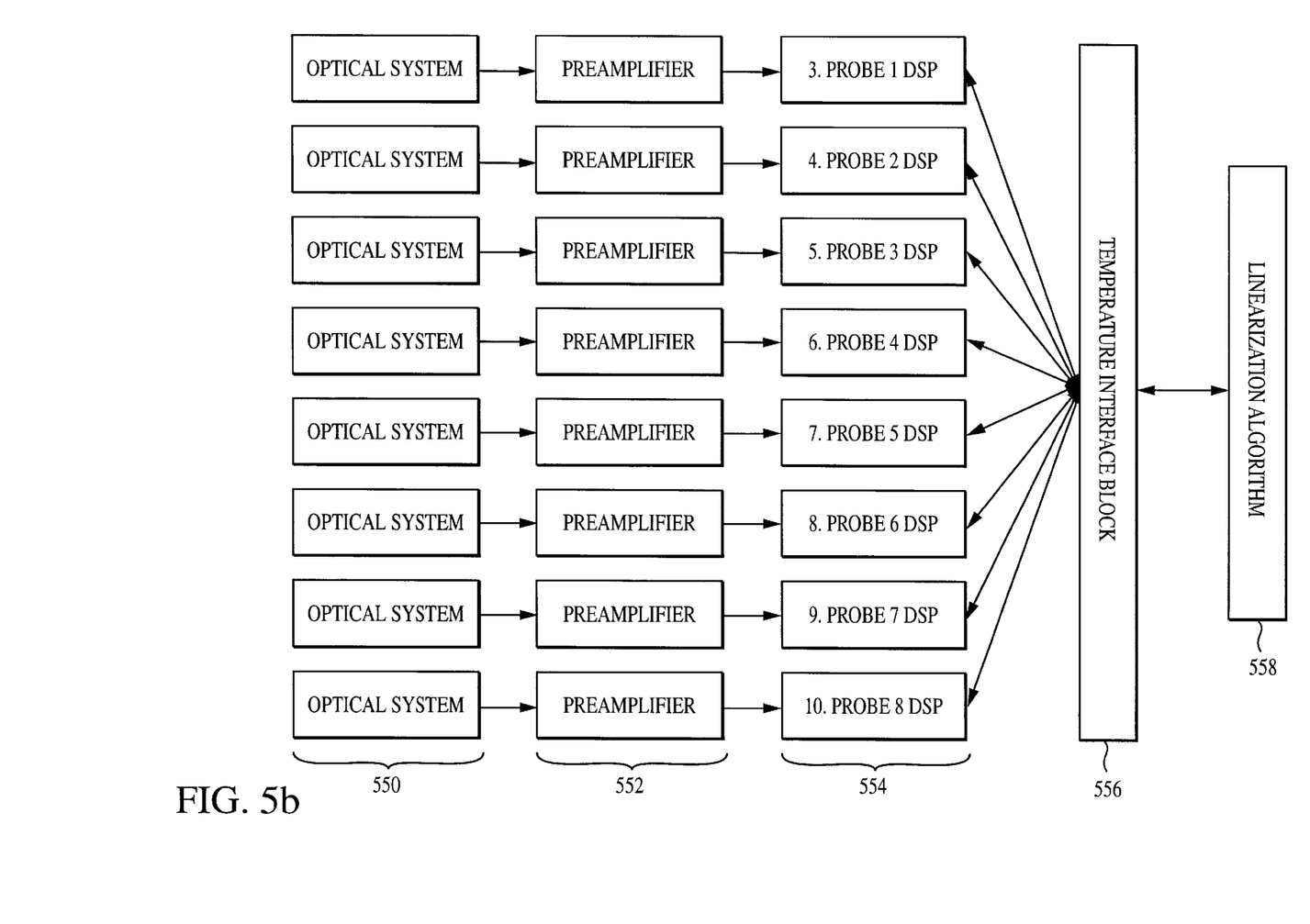
FIG. 5b is a block diagram depicting a temperature measurement system as contemplated by embodiments of the present invention.

A more detailed depiction of temperature measurement system 520 is described with regard to FIG. 5b. Referring now to FIG. 5b, embodiments of the present invention envision the use of (and/or use in environments with) optical systems 550 as part of (or used in conjunction with) a wafer processing chamber controlled by the present invention. Specifically, embodiments of the present invention contemplate that the temperature of the wafer is detected as a function of the light emitted due to being heated. To more accurately detect the emitted light (and thus, the heat) over different portions of the wafer, multiple optical systems (in this example, eight) are used. In this way, the present invention can detect variances in temperature at different portions of the wafer. The present invention can then cause the intensity of certain heat lamps affecting different portions of the wafer to increase or decrease (and/or cause the flow of cooling gases to vary in amount and/or type and/or flow to different portions of the wafer). It is also envisioned that the optical systems 550 serve to allow only selected wavelengths to enter, so that a more accurate reading of the temperature can be ascertained.

Of course, it should be understood that any number of other different types of schemes for detecting temperature are also contemplated by embodiments of the present invention, in addition to those that detect light.

Preamplifiers 552 serve to convert the current that are received by the optical systems 550 into voltage (on a scale of 0 to 5 volts) while the probes 554, which are digital signal processing filters, remove noise and also serve as A to D converters (One example of probes 554 is the T320C2xLP chip from Texas Instruments).

From the probes 554, the voltage is applied through a temperature interface block 556, and the measurement of the voltage is then analyzed by a linearization algorithm 558 which, depending upon the received voltage, determines the temperatures of each portion of the wafer observed by one the optical systems 550. Embodiments of the present invention contemplate that the linearization algorithm 558 utilizes a look-up table using some interpolation, wherein the values of the look-up table are implemented based upon the particular material used in the wafer. That is, different substances will give off different amounts of light when heated, and thus the values in the look-up table must be set accordingly.

Figure 6:
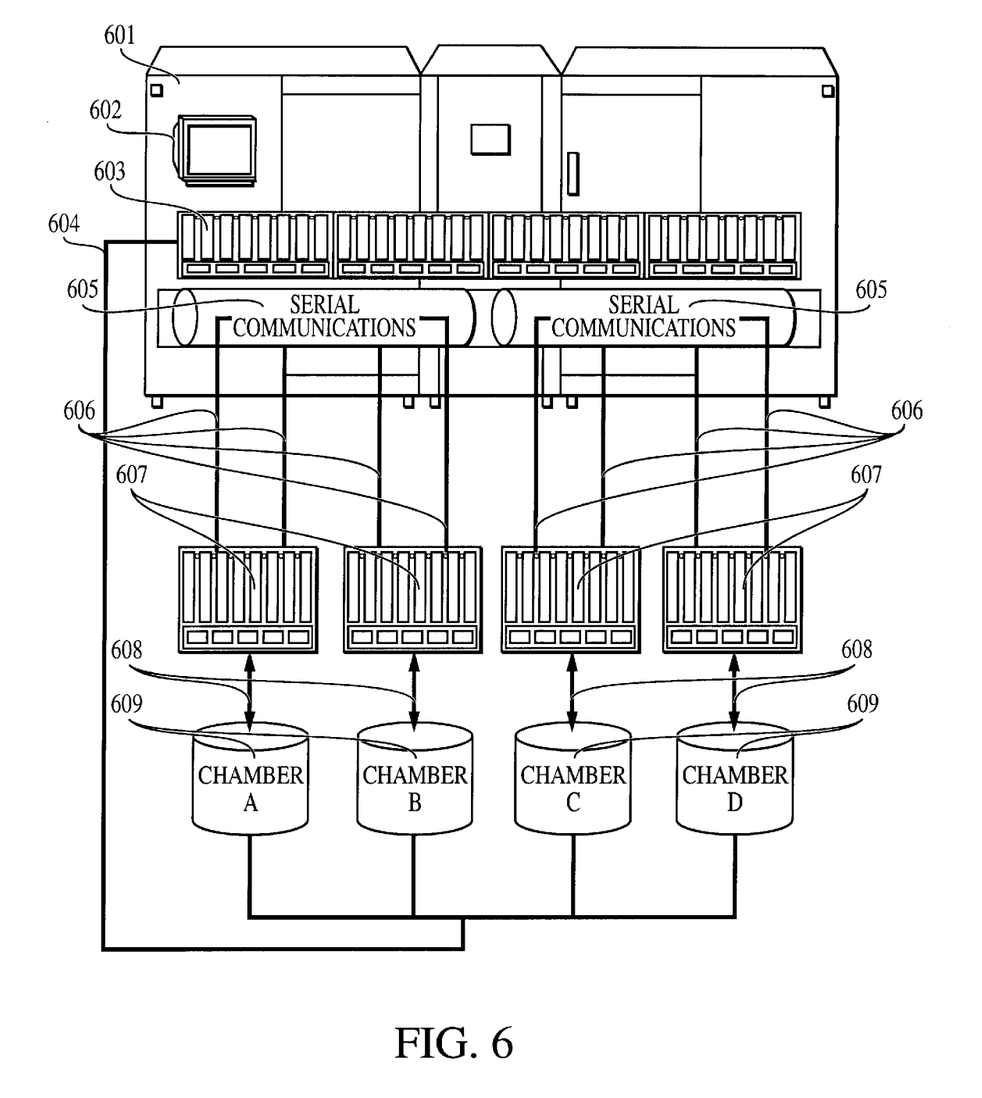
FIG. 6 is a diagram depicting an exemplary wafer processing facility having four wafer processing chambers and five computer processing systems, as contemplated by embodiments of the present invention.

FIG. 6 depicts an exemplary wafer processing facility disclosing features of, and/or environments encompassing, embodiments of the present invention. In this example, four wafer processing chambers and five different computer processor systems are utilized. Referring now to FIG. 6, a first computer processor system 601 is shown having a user interface 602 as well as a communications mechanism 603 and 604 for communicating with chambers 609. In addition, serial communications 605 and 606 are shown to be in communication with the second computer processor systems 607. Here, there are shown to be four separate second computer processor systems 607. While one second computer processor system is shown for each wafer processing chamber, it should be understood that the present invention also contemplates that, instead of four, less (or more) than four could also have been used to control the four chambers 609 (and, in fact, embodiments of the present invention event contemplate that a single computer processing system having at least two processors could be used in lieu of the five computer processing systems shown in the Figure). Lastly, the second computer processor systems 607 are shown to be in communication with the wafer processing chambers 609 via communication links 608.

An exemplary combination of computer processor systems and chambers can be found in the Radiance Centura device from Applied Materials.

Figure 7:
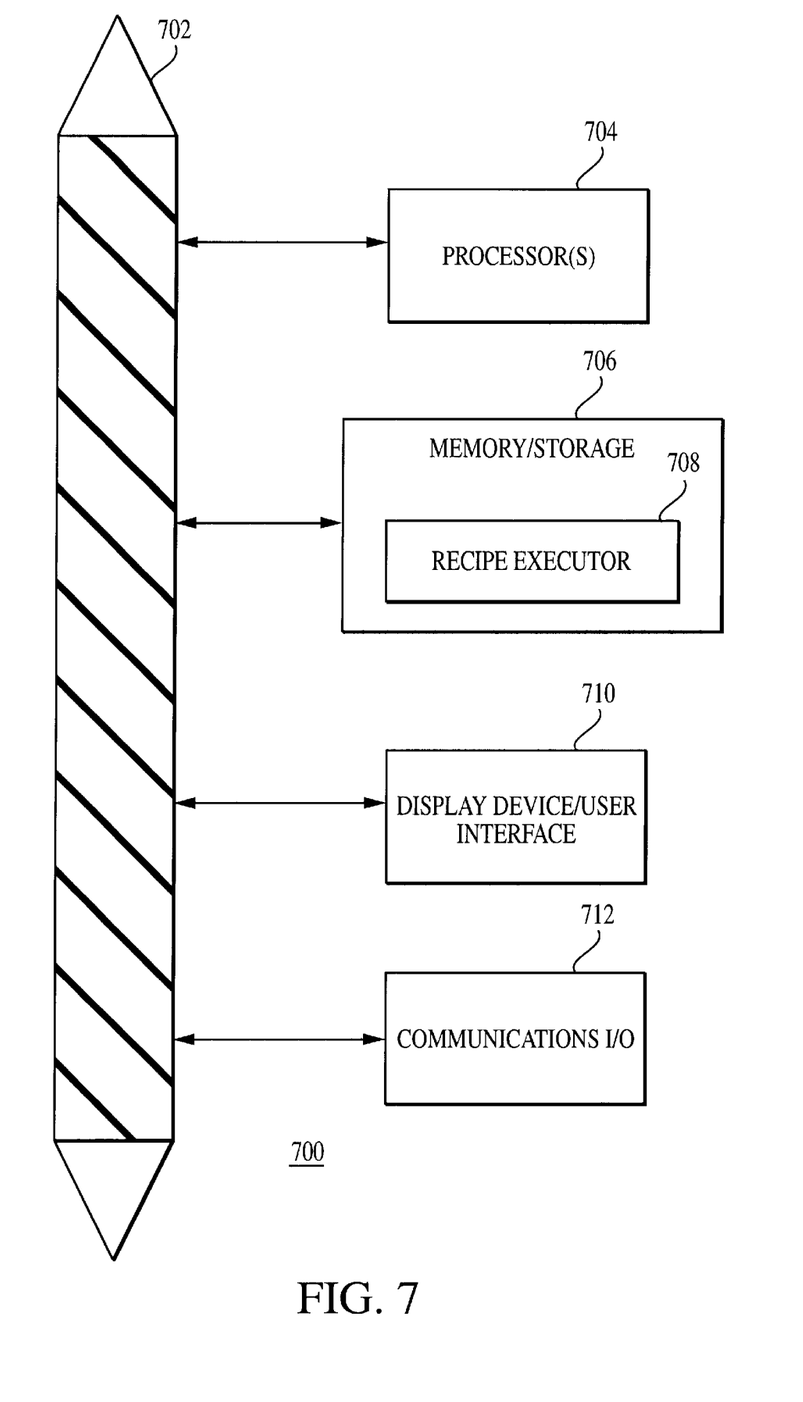
FIG. 7 is a high-level block diagram depicting aspects of a computer processor system as contemplated by embodiments of the present invention.

Exemplary components of a computer processing system used in conjunction with the present invention is now shown with regard to FIG. 7. Referring now to FIG. 7, a recipe executor 708 (representing software or the like having the functionality described herein) is shown to reside in a memory/storage device 706. It is also contemplated that instructions/functions can be stored as part of recipe executor 708 and/or as part of memory/storage device 706 and/or can originate from communications I/O 712 (mentioned below). Embodiments of the present invention contemplate that the memory/storage device 706 could be any number of different types of computer-readable mediums for storing information, including RAM memory, magnetic, electronic, atomic or optical (including holographic) storage, some combination thereof, etc.

Memory/storage 407 is shown as being in communication, via communication link 702 (e.g., a bus), with one or more processor(s) 704. Embodiments of the present invention contemplate that the processor(s) 704 can be those typically found in the computers mentioned below, or they can be any number of other types of processor(s).

In addition, display device and user interface 710 (e.g:, a mouse, keyboard, and/or modem) are shown. Communications I/O 712 serves to communicate with wafer processing chambers and other computer processing systems, and in FIG. 7 is shown to be in communication with processor(s) 704 and memory/storage 706.

The present invention further contemplates that communications I/O 712 can serve to receive various transmission schemes such as those relating to telecommunications, cable or other transmission mechanisms, and that at least some of the aspects of recipe executor 708 can, in whole or part, be a transmission. Thus, for example, at least some aspects of recipe executor 708 that would otherwise originate from memory/storage 706 could instead originate from communications I/O 712 (e.g., the medium from which the recipe executor 708 originates can be a transmission).

It should be understood that the configuration of the various aspects of the present invention depicted by FIG. 7 are by way of example, and at the present invention contemplates any number of different configurations and/or different components.

With regard to the various specific components contemplated for use with regard to aspects of present invention as depicted by FIG. 7, one exemplary embodiment includes the use of a Motorola 68000 series processor such as the 68040 processor (from Motorola of Schaumberg, Ill) for use with a first computer processor system (where e.g., the functions described with regard to Block 502 of FIG. 5a are being controlled) using the "Boss" operating system from Applied Materials or the VRTX operating system from Mentor Graphics Corporation, of San Jose, Calif. For the second computer processor system where, e.g., temperature is being controlled (described with regard to Block 518 if FIG. 5a), an exemplary operating system is also the VRTX operating system using any number of different types of Pentium processors from Intel Corporation of Santa Clara, Calif. Of course, it should be understood that any number of different types and combinations of processors and operating systems could also be used with either of the computer processor systems.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using the C, C++, or Pascal or any assembly language appropriate in view of the processor(s) being used. It could also be written in an interpretive environment such as Java and transported to multiple destinations to various users.

It is also to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A method for controlling at least a first and second function performed by a wafer processing chamber, wherein a first processor controls the first function and a second processor controls the second function, the method comprising the steps of:
   (1) accessing or receiving a recipe containing one or more instructions used for controlling the wafer processing chamber, wherein at least one of said instructions contains a function to be performed by the wafer processing chamber;
   (2) receiving an indication that a wafer to be processed has been or will be loaded into the wafer processing chamber;
   (3) obtaining a next instruction, from said one or more instructions;
   (4) determining, in accordance with said instruction of said step (3), a function to be performed by the wafer processing chamber;
   (5) when the function of said step (4) to be performed is said first function, using the first processor to induce the wafer processing chamber to perform said first function, and when the function of said step (4) to be performed is said second function, using the second processor to induce the wafer processing chamber to perform said second function,
   (6) upon determining that a last instruction of said one or more instructions in said recipe has not been implemented, returning to said step (3).

2. The method of claim 1, wherein said step (1) comprises the step that at least one of said one or more instructions contains both a function to be performed by the first processor and a function to be performed by the second processor.

3. The method of claim 2, wherein said steps (3)–(6) are performed substantially simultaneously by each of said first and second processor.

4. The method of claim 3, further comprising the step of determining, based upon said instruction of said step (3), whether said first or said second processor is to perform an end step function, and continuing to implement said step (5) until said end step function is performed.

5. The method of claim 1, wherein each of said processors operates within a separate computer processor system and utilizes a separate operating system.

6. The method of claim 1, wherein said first function is temperature control.

7. The method of claim 6, further comprising the step of analyzing the temperature of at least two different portions of the wafer, and adjusting the temperature of each of said two different portions of the wafer, in accordance with said instruction of said step (3).

8. A wafer processing facility, comprising:
   a wafer processing chamber for processing semiconductor wafers;
   at least a first and second computer processor system containing a first and second processor, respectively, wherein said first processor is assigned to control a first function of said wafer processing chamber and said second processor is assigned to control a second function of said wafer processing chamber;
   a command storage device for storing a plurality of commands to be performed by said wafer processing chamber relating to said first and second functions;
   a command accessor for accessing or forwarding a next one of said plurality of commands to said first and/or second processor;
   a function determinator for determining whether said next one of said plurality of commands is associated with the first function or associated with the second function,
      wherein the first processor is used to implement said next one of said plurality of commands when said next one of said plurality of commands is associated with the first function, and the second processor and the second processor is used to implement said next one of said plurality of commands when said next one of said plurality of commands is associated with the second function.

9. The wafer processing facility of claim 8, wherein said first function is pressure control, and said second function is temperature control.

10. The wafer processing facility of claim 9, further comprising a temperature controller, wherein said temperature controller receives input from at least two different portions of the wafer, and adjusts the temperature of each of said two different portions. of the wafer using said second processor, in accordance with a command for controlling temperature.

11. The wafer processing facility of claim 9, wherein said command accessor commences accessing or forwarding said one or more commands in response to an indication that said wafer processing chamber has been, or will be, loaded with a wafer.

12. The wafer processing facility of claim 9, wherein a command to implement a temperature control function and a command to implement a pressure control function can be executed at least substantially concurrently.

13. The wafer processing facility of claim 12, further comprising an end step determinator, wherein said end step determinator determines whether said first or said second processor is to perform an end step function.

14. A computer readable medium for controlling a wafer processing chamber, comprising:
   a recipe module for storing a plurality of instructions containing one or more commands for controlling the wafer processing chamber;
   a first module, wherein said first module is assigned to control a first function that may be implemented on said wafer processing chamber, in accordance with said one or more commands,
      said first module being executed using a first computer processor system;
   a second module, wherein said second module is assigned to control a second function that may be implemented on said wafer processing chamber, in accordance with said one or more commands;
      said second module being executed using a second computer processor system;

a function determination module for determining whether one of said one or more commands received from said recipe module is associated with said first function or with said second function, wherein said first module implements those of said one or more commands associated with the first function, and said second module implements those of said one or more commands associated with second module.

15. The computer readable medium of claim 14, further comprising a wafer detection module for receiving and indication that a wafer has been, or will be, loaded into the wafer processing chamber, and initiating the implementation of said one or more commands in said recipe module.

16. The computer readable medium of claim 14, wherein said first module is a temperature control module, and at least one of said one or more commands is associated with temperature.

17. The computer readable medium of claim 16, wherein said temperature control module receives temperature input from at least two different portions of said wafer in said wafer control chamber, and controls the amount of heat directed to said at least two different portions of said wafer, in accordance with said one of said one or more commands associated with temperature.

18. A computer readable medium comprising a program for controlling at least a first and second function performed by a wafer processing chamber, wherein a first processor controls the first function and a second processor controls the second function, by performing the steps of:

(1) accessing or receiving a recipe containing one or more instructions used for controlling the wafer processing chamber, wherein at least one of said instructions contains a function to be performed by the wafer processing chamber;

(2) receiving an indication that a wafer to be processed has been or will be loaded into the wafer processing chamber;

(3) obtaining a next instruction, from said one or more instructions;

(4) determining, in accordance with said instruction of said step (3), a function to be performed by the wafer processing chamber;

(5) when the function of said step (4) to be performed is said first function, using the first processor to induce the wafer processing chamber to perform said first function, and when the function of said step (4) to be performed is said second function, using the second processor to induce the wafer processing chamber to perform said second function, (6) upon determining that a last instruction of said one or more instructions in said recipe has not been implemented, returning to said step (3).

19. The computer readable medium of claim 18, wherein said step (1) comprises the step that at least one of said one or more instructions contains both a function to be performed by the first processor and a function to be performed by the second processor.

20. The computer readable medium of claim 19, wherein said steps (3)–(6) are performed substantially simultaneously by each of said first and second processor.

21. The computer readable medium of claim 20, further comprising the step of determining, based upon said instruction of said step (3), whether said first or said second processor is to perform an end step function, and continuing to implement said step (5) until said end step function is performed.

22. The computer readable medium of claim 18, wherein each of said processors operates within a separate computer processor system and utilizes a separate operating system.

23. The computer readable medium of claim 18, wherein said first function is temperature control.

24. The computer readable medium of claim 23, further comprising the step of analyzing the temperature of at least two different portions of the wafer, and adjusting the temperature of each of said two different portions of the wafer, in accordance with said instruction of said step (3).

* * * * *